United States Patent Office 3,183,180
Patented May 11, 1965

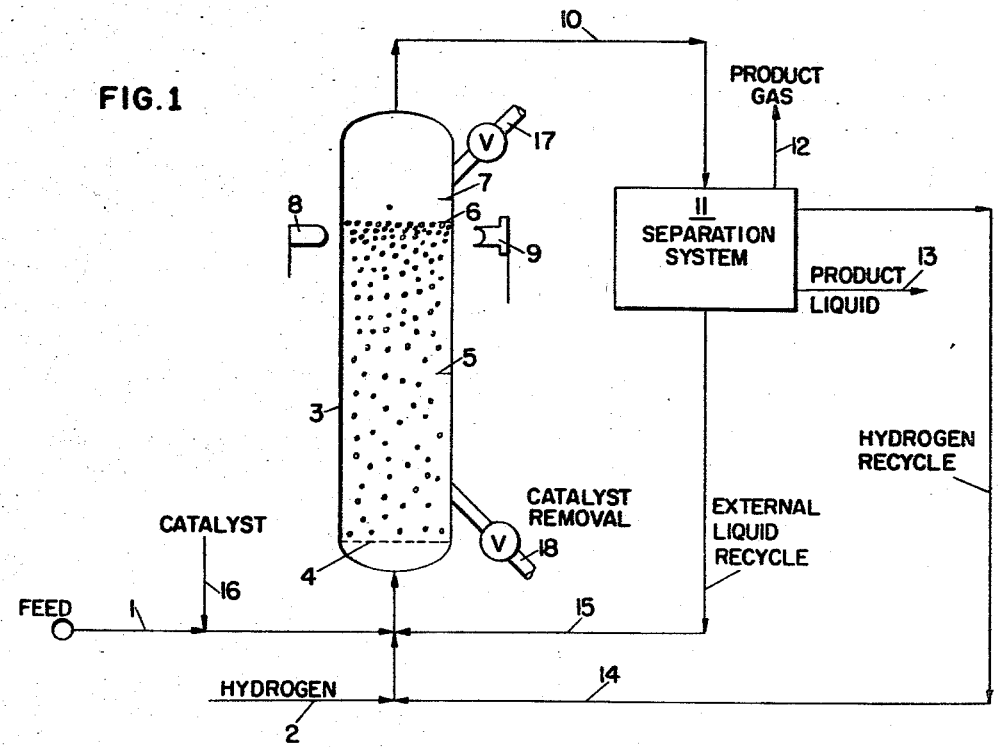
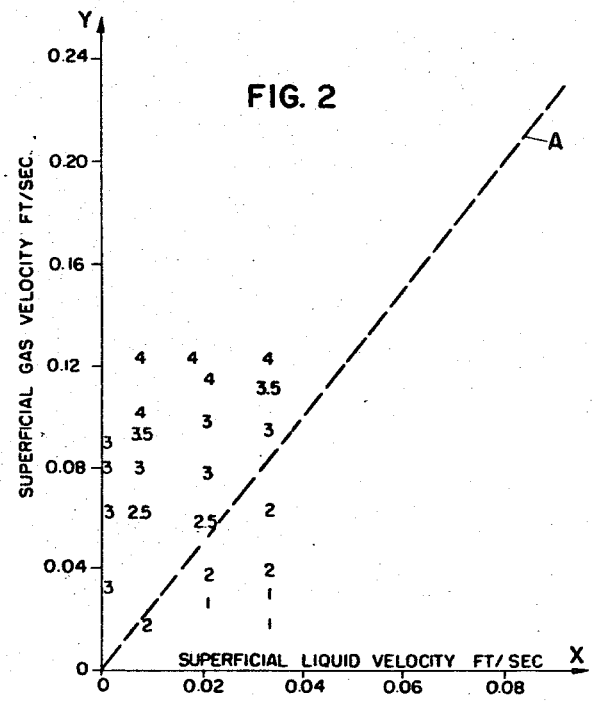
INVENTOR.
SEYMOUR C. SCHUMAN
RONALD H. WOLK
MICHAEL C. CHERVENAK
BY Nathaniel Ely

3,183,180
HYDROGENATION OF OILS

Seymour C. Schuman, Princeton, Ronald H. Wolk, Lawrence Township, Mercer County, and Michael C. Chervenak, Pennington, N.J., assignors to Hydrocarbon Research, Inc., New York, N.Y., a corporation of New Jersey
Filed Feb. 18, 1964, Ser. No. 345,639
7 Claims. (Cl. 208—143)

This invention is a continuation-in-part of our application, Serial No. 214,984, filed August 6, 1962, now abandoned.

This invention relates to an improved process of treating hydrocarbon oils with hydrogen in the presence of a catalyst. More particularly, the invention is concerned with the catalytic treatment of heavy hydrocarbon oils to effect hydrocracking and hydrodesulfurization.

Hydrogen treatment of heavy oils, while desirable economically, has been beset with many formidable problems. One of these has been the necessity of carrying out reactions which produce coke on a mass of catalytic material without "plugging" the catalyst bed. A second problem has been the necessity of maintaining a stable and satisfactory reaction temperature when the reactions which occur are highly exothermic.

A gas-liquid contacting process has been disclosed by Johanson, U.S. Patent 2,987,465, which completely eliminates high pressure drop or plugging difficulties resulting from carbon formation. In this invention, Johanson contacts gases, liquids and solids under conditions so that the solids are in an expanded state and occupy at least 10% greater volume than the settled state of the mass and are in random motion in the gas-liquid system. Such a mass of solid particles in this state of random motion in a liquid or gas-liquid medium may be described as "ebullated." It should be noted that in an ebullated bed, there is a sharp and finite level of the solid, below which the solid exists at a concentration in excess of 5 lbs. per cubic foot, and above which it has a concentration of less than 0.10 lb. per cubic foot. It is obvious that the ebullated bed completely eliminates difficulties due to the plugging heretofore experienced in conventional fixed bed reaction systems. A collateral benefit of the ebullated bed is that it permits the use of very active catalyst particles of relatively small particle size, which otherwise would be essentially inoperable in a fixed bed system due to excessive pressure drop.

However, a priori, the use of an ebullated bed does not eliminate the heat release problems encountered in hydrogenation reactions. In general, it can be said that such problems become severe in a hydrogenation system when hydrogenation consumption is obtained corresponding to more than 500 standard cubic feet per barrel of oil fed. Experience has shown that in hydrogenation, hydrodesulfurization, and hydrocracking reactions, the consumption of 1 cubic foot of hydrogen is accompanied by a heat release of from about 50 to about 75 B.t.u. (British thermal units). From this, it can be readily calculated that the consumption of 500 cubic feet of hydrogen per barrel of oil charged will produce a temperature rise across the bed of from 60 to 90° F. if no means of cooling is provided. Obviously, such temperature rises can become much more severe; for example, in cases where hydrogen consumption is 1500 standard cubic feet per barrel of feed oil charged, temperature rises of 180 to 270° F. will be experienced unless some method of temperature control is utilized. Such high temperature gradients across the bed pose many problems, the principal one being that at least part of the catalyst will be contacted at temperature conditions at which it will be severely deteriorated and degraded due to excessive coke formation.

There are several ways of coping with the large exothermicity of hydrogenation reactions. The method most prevalently used, is to introduce streams of cold hydrogen at various levels in the reactor so as to quench the hydrogenation reactions stagewise. This procedure is expensive. The reactor must be provided with numerous pipes and nozzles, each with its separate metering system for hydrogen flow; in addition, in many cases, an excessive amount of hydrogen must be utilized over that most favorable for the desired hydrogenation reactions. A superior method of providing temperature control has been described in the invention of Pichler, U.S. Patent 2,910,433, which describes recycle of the treated liquid oil at reactor effluent conditions at a rate of at least 5 times that of the feed oil charged to the system. The internal liquid recycle provides a heat sink which largely dissipates the heat released in the hydrogenation reaction. For example, with an internal liquid recycle of 10/1 based on feed oil, a temperature rise across the reactor of 180° F. can be reduced to one of only 25° F. It should be noted that such internal recycle can be effected with or without a pump, and with the recycle conduit either inside or outside of the reactor.

Use of the ebullated bed system with internal recycle largely eliminates the major problems associated with deep hydrogenation. However, it should be noted that this system has limitations. As noted in the aforementioned patent of Johanson, catalyst particle size is usually limited to that coarser than 60 mesh, although it would be highly desirable to reduce particle size still further to utilize still more active catalysts. However, when using finer catalysts and recycling as in the Pichler invention, with a pump, problems on the pump become severe and expensive due to the erosive action of the catalyst particles which are carried into the recycle stream. When no pump is employed, the circulation of liquids is not positive and has a tendency in certain applications to become unstable; in this case, the presence of catalyst particles in the internal liquid recycle stream increases the instability of the recycle flow. Such instability or loss of recycle cannot be tolerated in a hydrogenation system designed for recycle for temperatures in the reactor will rise excessively, deteriorating the catalyst, and in many cases where the reactor is designed for a given maximum temperature, a real danger of reactor rupture will exist leading to fires, explosions, etc.

Thus, it is the object of the present invention to provide an effective hydrogenation system for heavier oils in which catalysts of relatively fine particle size can be employed in an ebullated bed at conditions in which hydrogen consumption is at least 500 cubic feet per barrel of feed oil charged.

The invention results from and is made clear in Lucite tube tests in which, if conditions are chosen correctly, an analogy to actual hydrogenation conditions is provided. Such Lucite tube tests conveniently simulate the action and motion of the gases, liquids and solids as they exist in the hydrogenation reactor. Lucite or any other clear material may be used to contain the gas-liquid-solid system. We have utilized a cylindrical Lucite tube of 6 inches in diameter and of 20 feet height, as well as a square vessel 24 inches on each side and 8 feet in height. Since the heavier oils which concern this invention have very little viscosity at the elevated temperatures usual in hydrogenation, we employ heptane in the Lucite tube tests. Similarly, we utilize nitrogen as the gas, since the density of hydrogen in a hydrogenation system at elevated pressure is considerably increased. Catalysts actually employed in hydrogenation systems are utilized in the Lucite tube tests; they may be screened to any particle size range which is desired. We believe and have some evidence that such a Lucite tube system using heptane, nitrogen, and catalyst approximates with reasonable accuracy the conditions of motion and turbulence which occur in a hydrogenation reactor.

We observe the following: Using cobalt molybdate on alumina catalyst of about 160 mesh average particle size, a superficial velocity of 0.012 foot per second of heptane and a superficial velocity of 0.10 foot per second of nitrogen, an ebullated bed is readily obtained with a catalyst density of 30 pounds per cubic foot in the dense part of the tube, and a catalyst density of less than 0.20 pound per cubic foot in the upper dilute part of the tube. Under these conditions, there is some turbulence of the solids, which obviously, since they are not carried out of the tube, have some top-to-bottom motion. However, this motion is not extreme. In addition, the liquid and gas seem to flow smoothly upwardly through the tube with very little top-to-bottom motion.

However, in the aforementioned Lucite tube test, if the superficial liquid velocity is reduced from 0.012 foot per second to 0.006 foot per second, maintaining the same bed of catalyst, and maintaining the gas velocity at 0.10 foot per second as before, the turbulence of the system increases strikingly and dramatically. The gas bubbles seem to occupy a greater part of the tube. More importantly, large swirls of liquid are observed in a downward direction. The agitation of the catalyst is markedly increased, both with respect to the extent of downward motion and velocity. It is readily and completely apparent that the system with a lower liquid flow is markedly more turbulent than that with a higher liquid flow. Such turbulence is collateral with considerably more top-to-bottom mixing both of liquid and solids. Under the more turbulent conditions, it would be surely expected that considerably more top-to-bottom heat transfer would occur.

The results described above in the Lucite tube tests are completely unexpected. It is a truism that turbulence is associated with higher velocities rather than lower. Yet, in the tests described, reduction of liquid velocity increases both turbulence and top-to-bottom mixing. This effect is unmistakable; photographs of such Lucite tube systems clearly illustrate the effect beyond question.

After the observations in the Lucite tube as described above, we have carried out numerous similar tests, varying the particle size and density of the solids, gas and liquid velocity, and the density and viscosity of the liquid. These tests have been carried out in tubes of various effective diameters and heights. In general, the effects described are observed in all tubes above 1½ inch in diameter. Within the range of conditions for hydrogenation, the major variables which affect the turbulence and top-to-bottom mixing of the ebullated bed seem to be the gas and liquid velocities; secondary factors are the density and particle size of the solids utilized. However, using catalysts of varying average mesh sizes between 20 and 325 mesh (Tyler Mesh Classification) and of bulk densities between 25 and 150 pounds per cubic foot, it is apparent that considerable turbulence and top-to-bottom mixing is obtained when the ratio of the superficial liquid velocity over the superficial gas velocity does not exceed 0.4. Thus, the Lucite tube tests illustrate, and in the example which follows, it will be shown that analogous results are obtained in an actual hydrogenation system, that if the liquid velocity is maintained below 0.4 times the gas velocity, the considerable turbulence and top-to-bottom mixing which is obtained can substantially, in many cases, eliminate the need for temperature control devices in hydrogenation processes. The reactor temperature gradients which would normally be expected are leveled out and essentially dissipated by the considerable top-to-bottom mixing which occurs. Thus, finer materials might be generally used in an ebullated bed system without the difficulties in maintaining an internal recycle flow or the cost of cold hydrogen quench systems as noted previously. In contrast, if the ratio of the liquid to gas velocity exceeds 0.4, the Lucite tube seems to indicate such a small extent of top-to-bottom mixing that such temperature control devices will certainly be necessary.

We consider that maintenance of the liquid velocity at or below 0.4 times the vapor velocity will be of value in any hydrogenation process in which hydrogen consumption is 500 cubic feet per barrel of feed oil charge or greater. In general, hydrogen consumption of this or greater order of magnitude are obtained in the hydrogenation, hydrodesulfurization, and hydrocracking of heavier oils, either distillates, residuums, or mixtures containing significant amounts of distillate boiling above 650° F. such as crude oil. Such charge stocks are substantially liquid at process conditions generally employed for hydrogenation, hydrodesulfurization and hydrocracking.

Catalysts which may be employed in this invention include those generally recognized to have activity for hydrogenation such as the metals, salts or oxides or, most prevalently, sulfides of elements such as cobalt, molybdenum, iron, chromium and the so-called precious metals such as platinum, palladium, etc. Such hydrogenation components are generally supported on carriers such as alumina or mixtures of silica and alumina. Often, such catalysts contain a small amount of fluoride or chloride. Such catalysts generally have a high catalyst activity per unit weight; however, it has been found that various naturally occurring ores and minerals such as clay and bauxites have less, but sometimes useful activity with respect to hydrodesulfurization, hydrogenation, or hydrocracking. Any of these solids may be used in this invention. However, the size of the particles of whatever catalytic agent is employed is restricted to an average finer than 20 mesh Tyler screen size and not finer than 325 mesh Tyler screen size. Such restriction arises from the fact that it is difficult to obtain an ebullated bed under practical conditions with catalysts coarser than 20 mesh, whereas catalysts substantially finer than 325 mesh will be carried from the reactor (in the so-called slurry phase) unless means for catalyst disengagement is provided, as by expansion of the top of the reactor. In this connection, "average" refers to the weighted average particle size as defined and used by those skilled in the art.

The hydrogenation operation may suitably be carried out at temperatures in the range of about 650 to 875° F. with a total pressure in the range of 500 to 5000 pounds per square inch gauge, and a hydrogen pressure in the range of 400 to 4000 pounds per square inch gauge.

The hydrogenation process may be carried out stepwise as in the patent of Keith and Layng, U.S. No. 2,987,467, or in the patent of Schuman, U.S. No. 3,050,459. Where multiple stages are employed, the present invention may apply to each of the stages, as long as an ebullated bed is employed and a liquid phase is present. Thus, in each stage, conditions must be met to provide a liquid velocity which does not exceed 0.4 times the vapor velocity in each reactor at the conditions of temperature and pressure extant in each reactor.

In other respects, the process of this invention is similar to oil hydrogenation systems which are extensively described in patent and technical literature. However, the attached drawing in which FIG. 1 is a schematic flow diagram for hydrogenation of oil, and FIG. 2 is a chart of gas and liquid velocity tests, and the following description, will serve to further clarify a preferred form of embodiment of the invention.

As shown in FIG. 1, a hydrocarbon feed from line 1, together with hydrogen-containing gas from line 2, both suitably preheated, are passed upwardly into the reactor 3. Entering the reactor the stream passes through a distribution device such as that schematically illustrated as 4. The reactor contains a mass of solid particles of hydrogenation catalyst; when the process is not in operation the catalyst has a stationary bed level 5. However, when the process is carried out as in this invention, the catalyst particles are in constant random motion with respect to each other as the gross mass is expanded so that its upper boundary or upper level of ebullation is at 6. Not far above this point, at the zone shown in the drawing at 7, a phase which contains essentially no catalyst is obtained.

The level 6 can be established by the use of a gamma ray instrument (such as that manufactured by the Ohmart Corporation or by Industrial Nucleonics Co.), by which the mass within the reactor can be established at any reactor height. Gamma rays from the source 8 are absorbed to a varying extent by the mass of material they "see" in passing to the sensing element 9. When the gamma rays must pass through the high density catalyst-containing phase, a much lower reading is obtained on the sensing element, than when no catalyst is present. Thus, if the instrument is suitably mounted (such as on a vertical trolley for example), and suitably calibrated, it can establish level 6 with virtual certainty, and furthermore establish the catalyst density which exists at level 6 with high accuracy.

In the example shown, the reaction products leave the reactor 3 through line 10 without separation. However, as well known to those skilled in the art, suitable devices may be installed within the reactor to remove the liquid and gaseous streams separately as by a trap-tray.

The product stream passes into the separation system 11, in which the usual product and recycle streams are obtained by conventional procedures. Schematically illustrated in the drawing are product gas and product liquid streams 12 and 13, and hydrogen recycle stream 14. In the process of this invention an external liquid recycle stream is seldom employed, since single pass conversion is generally high; however, the possibility of such a stream is indicated by the line 15.

Using an ebullated bed as described herein, fresh catalyst may be continuously or semi-continuously added to the reactor system with the feed as shown in line 16, or by a conventional lock-hopper system as in 17. Similarly spent catalyst may be withdrawn through 18. In some cases deactivation of the catalyst is at such a slow rate that the very small loss of catalyst overhead is sufficient to accomplish the desired withdrawal. Obviously the fact that these degrees of freedom are possible in an ebullated bed, making it possible to replace catalyst at a desired rate without shut-down of the unit, represents a considerable advantage in the use of this system.

It is further obvious that such catalyst withdrawn from the reactor may be regenerated or reactivated by various procedures to remove coke, deposited metals, etc.

As described and shown in the illustration, there are many ways possible to carry out this invention. However, the liquid velocity (obtained by summing the volumes of streams 1 and 15 and correcting them for reactor process conditions) must be less than 0.4 times the gas velocity (obtained by summing the volumes of streams 2 and 14 with similar corrections). Further, average catalyst particle size must be between 20 mesh and 325 mesh Tyler particle size so as to obtain the ebullating bed as described. Finally, as shown in the drawing, a catalyst settling zone, generally effected by decreasing velocity at the top of the reactor by an expanded section, is not employed in the present invention. All of these features produce an economic, effective system for accomplishing exothermic hydrogenation reactions.

As more particularly shown in FIG. 2 and as hereinbefore described, we have shown the observed test data in operating in a Lucite tube under conditions that we have found closely simulate commercial hydrogenation conditions. In these tests, as indicated on the chart, the superficial liquid velocity in feet per second is represented as the abscissa O–X and the superficial gas velocity is represented as the ordinate O–Y. Within this chart, the specific gas-liquid ratios were varied and the amount of backmixing, which controls the temperature, was indicated by observation. These arbitrary ratings as indicated on the chart are as follows:

Index value (1) indicated that the bubbles rise essentially vertically and thereby take the shortest path through the mixture with a minimum of backmixing.

Index value (2) indicated that the bubbles begin to oscillate from side to side with an extremely small minority descending in their path before being carried upward again.

Index value (3) indicated that the backmixing is strong and great eddies are formed in the system with the catalyst, liquid and gas all backmixing as a semi-homogenous phase.

Index value (4) was assigned to swirls which approached 4–6 feet in length.

Although there were changes in going from one level to another, the most important change occurred in levels between index values (2) and (3) and in this area there is sufficient backmixing to essentially equalize the temperature in the reactor.

In going from conditions (3) to (4), there is a dramatic change observable in the extent of the swirls but since the temperature differential is already sufficiently low for a hydrogenation system, it is considered to be of no real advantage to the system to use such a gas-liquid ratio.

This ratio of liquid flow to gas flow is thus an essential characteristic of the process and as shown in the chart, FIG. 2, the line O–A which has a ratio of 0.4 is considered to be the demarkation between the less effective and the most effective for the purpose in that the ratio of less than 0.4 is of no real advantage in that the degree of additional temperature control is small whereas with a ratio of more than 0.4 the backmixing is reduced to such an extent that the gas bubbles flow directly upward with a tendency of the temperature to rise beyond desired limits.

The significance of this temperature control is of great importance in a hydrogenation reaction wherein the operating temperature is preferably maintained as high as possible without exceeding the critical. It is recognized that the heat of reaction in hydrogenation for olefin saturation is about 55,000 B.t.u.'s per pound mol hydrogen consumed, and about 30,000 B.t.u.'s per pound mol of hydrogen consumed for aromatic saturation. For selectivity to desired products and for catalyst life between regenerations, it is essential to maintain the reaction as near to isothermal as possible and ideally the temperature should rise no more than 10–20° F.

Following the foregoing analysis of the backmixing, based on a gas-liquid ratio, the following examples were carried out under laboratory conditions as hereinafter stated.

*Example 1*

The run described was carried out in a pilot plant of nominally thirty barrels per day capacity, with a reactor of 8.5 inches diameter, and an effective height of 18 feet. The feed was a sour vacuum bottoms of mixed West Texas, East Texas, and Louisiana crudes. The feed had a gravity of about 10° API, and a sulfur content of about 3.3 weight percent. It contains only about 10 volume percent of material distillable overhead under vacuum. The run was made with total pressure maintained at 2850 p.s.i.g., providing a hydrogen pressure of 2400 p.s.i. Temperature averaged 848° F. The catalyst employed was powdered cobalt molybdate on alumina of a particle size range between 100 and 300 mesh, with a weighted average particle size of 160 mesh.

At these conditions the catalyst in the reactor was ebullated as evidenced by a gamma ray instrument which showed a high concentrative catalyst zone corresponding to 28 lbs./ft.$^3$ in which the catalyst was expanded by 60% over its settled volume, above which there was a low concentration zone with catalyst at a concentration of .02 lb./ft.$^3$.

The conditions chosen for the operation were to convert at least 60% of the non-distillate material in the charge to distillate. Under these conditions, the 10° API charge stock was converted to 103.5 volume percent of a 20° API product containing about 1.0 weight percent sulfur. Hydrogen consumption was 890 standard cubic feet per barrel. At the operating conditions utilized, such hydrogen consumption would theoretically produce a temperature rise across the reactor from bottom to top of 138° F.

However, operating with a ratio of liquid to gas velocity of 0.09, a temperature rise of only 6° F. was observed across the bed. When the liquid velocity was increased to 0.14 times the gas velocity, the temperature gradient across the reactor increased to 13° F. Although it was impossible in the available pilot system to increase the liquid velocity to the limit specified in this invention, it is readily apparent that further increases would lead to increased temperature gradients across the reactor and ultimately to an undesirable temperature condition for the catalyst.

This is based not only on the observations in the Lucite tube but on numerous experiments in an adiabatic reactor wherein it is desired to operate at as high a temperature as possible without the formation of coke which results when an uncontrolled temperature rise takes place. In such case, the coke tends to increase at a rate such that the operation of the hydrogenation reaction must be curtailed either in a matter of days or even hours which cannot be tolerated in a commercial operation.

*Example II*

This run was carried out in the same pilot plant as described in Example I. The feed was a Kuwait heavy virgin gas oil having a gravity of 22.1° API, a sulfur content of about 2.63 weight percent and a boiling range of about 600° F.–1100° F. The run was made at a total pressure of 2000 p.s.i.g. corresponding to a hydrogen pressure of about 1800 p.s.i.g. The temperature averaged 790° F. The catalyst employed was a nickel-tungsten on silica alumina of a particle size range between 100 and 325 mesh, with a weighted average particle size of 160 mesh.

At these conditions, the catalyst in the reactor was ebullated as evidenced by the gamma ray instrument which showed a high concentrative catalyst zone corresponding to 40 lb./cu. ft. in which the catalyst was expanded by about 40 percent over the settled volume and above which there was a low concentration zone with catalyst at a concentration of about .02 lb. per cu. ft.

The conditions chosen for the operation were to convert at least 60 weight percent of the material to a fraction boiling up to 650° F. Under these conditions, the charge stock was converted to 110 volume percent of product having a very low sulfur content. The hydrogen consumption was approximately 1200 s.c.f. per barrel. The operating ratio of liquid to gas velocity was .035 and the temperature increase was only 5° F.

*Example III*

Another run was made on the same unit as described in Examples I and II and with the catalyst described in Example II. In this case, the feed was a No. 4 fuel oil of 440–650° F. boiling range of 25.5° API gravity. The liquid to gas velocity ratio was .043 and the observed temperature differential was 7° F.

*Example IV*

The invention is also applicable to the hydrogenation of a coal, such as Illinois No. 6 (bituminous) from the Belleville area. In such case, the coal ground to a fineness all of which passed a 270 mesh (Tyler) screen was slurried with oil formed in the process. The reactor was operated at a total pressure of 2700 p.s.i.g. and at an average temperature of about 835° F. The catalyst was cobalt molybdate extended on alumina. The hydrogen throughput was 43 standard cubic feet of hydrogen per pound of coal and the coal throughput was approximately 0.2 pound of coal per pound of slurry. The conversion, on a moisture and ash free basis to liquid and gas was in excess of 80 percent. The liquid to gas ratio was 0.08 and the temperature gradient was 9° F.

In general, the temperature conditions for a hydrogenation operation are in the general range of 650 to 900° F., being in the order of about 750 to 825° F. for desulfurization of black oil and in the order of 800–900° F. for cracking. Distillate is treated in the general temperature range of 650 to 850° F. While the catalyst particles may be ebullated in the range of 20 mesh to 325 mesh, the preferred operating range is from 60 mesh to 325 mesh.

It is thus apparent to us that we can obtain a superior hydrogenation reaction with a controlled temperature rise by maintaining a limited liquid to gas velocity in an ebullated bed type of reaction so that substantially isothermal conditions are maintained by the internal backmixing of the gas, liquid and catalyst.

We claim:

1. The process of hydrogenating a hydrocarbon oil in the liquid phase in the presence of a mass of particulate solids, of between about 20 mesh and 325 mesh (Tyler) average particle size, said solids being nominally maintained within a contact zone, which comprises passing the liquid oil and a hydrogen rich gas upwardly through the mass of solids, maintaining the zone at hydrogenation conditions of elevated temperature in the range of 650°–900° F. and hydrogen pressure in excess of 400 pounds per square inch gauge and up to about 4,000 pounds per square inch gauge, so that at least a substantial part of the oil remains in the liquid phase, maintaining liquid and gas velocity within the reactor so that the mass of particulate solids is in a state of random motion and expanded to occupy at least 10% greater volume than the settled state of the mass, maintaining in said contact zone an interface below which the mass of solids exists at a concentration greater than 5 pounds per cubic foot and above which said solids are at a concentration of less than 0.10 pound per cubic foot without employing a settling zone or other disengagement device, and operating the hydrogenation system to consume at least 500 cubic feet of hydrogen per barrel of liquid oil charged, and maintaining a liquid velocity in the hydrogenation reactor so as not to exceed 0.4 times the gas velocity.

2. The process of hydrogenating a hydrocarbon oil as claimed in claim 1 wherein the oil is derived from petroleum and contains at least ten percent of a fraction boiling above 900° F. and has a sulfur content of at least 1.0 wt. percent and the catalyst is from the class of cobalt, nickel and molybdenum, and mixtures thereof, extended on an alumina support.

3. The process of hydrogenating a hydrocarbon oil as claimed in claim 1 wherein the oil is a heavy gas oil and the catalyst contains a hydrogenation component from the class of nickel and tungsten and mixtures thereof, extended on a highly acidic support of silica alumina.

4. The process of hydrogenating a hydrocarbon oil as claimed in claim 1 wherein the oil is derived from coal.

5. The process of hydrogenating a hydrocarbon oil derived from petroleum and containing at least ten percent of a fraction boiling above 900° F. and having a sulfur content of at least 1.0 wt. percent in the liquid phase in the presence of a mass of particulate solids having an average weighted particle size between about 60 mesh and 325 mesh (Tyler), said solids being nominally maintained within a contact zone and having catalytic quantities of metals from the group cobalt, nickel and molybdenum and mixtures thereof extended on an alumina support which comprises passing the oil and a hydrogen rich gas upwardly through the mass of solids, maintaining the zone at hydrogenation conditions of elevated temperature and hydrogen pressure in excess of 400 pounds per square inch gauge and up to about 4,000 pounds per square inch gauge, so that at least a substantial part of the oil remains in the liquid phase and consumes at least 500 standard cubic feet of hydrogen per barrel of oil charge, maintaining liquid and gas velocity within the reactor so that the mass of particulate solids is in a state of random motion and expanded to occupy at least 10% greater volume than the settled state of the mass, maintaining in said contact zone an interface below which the mass of solids exists at a concentration greater than 5 pounds per cubic foot and above which said solids are at a concentration of less than 0.10 pound per cubic foot without employing a settling zone or other disengagement device, and maintaining a liquid velocity in the hydrogenation reactor so as not to exceed 0.4 times the gas velocity to maintain substantially isothermal conditions.

6. The process of claim 3 wherein the hydrocarbon oil has a boiling range up to 1200° F., the temperature is in the order of 790° F., the catalyst is nickel-tungsten on silica alumina, the pressure is in the order of 1800 p.s.i.g. and the conversion is in excess of 60 weight percent to a fraction boiling up to 650° F.

7. The process of claim 4 wherein the temperature is in the order of 835° F., the pressure is in the order of 2700 p.s.i.g., the catalyst is cobalt molybdate on alumina, and the conversion is in excess of 80 weight percent to liquid and gas.

References Cited by the Examiner
UNITED STATES PATENTS

| | | | |
|---|---|---|---|
| 2,987,465 | 6/61 | Johanson | 208—110 |
| 2,987,467 | 6/61 | Keith et al. | 208—97 |
| 2,987,468 | 6/61 | Chervenuk | 208—97 |
| 3,050,459 | 8/62 | Schuman | 208—97 |

ALPHONSO D. SULLIVAN, *Primary Examiner.*